United States Patent [19]

Asayama

[11] Patent Number: 5,165,108
[45] Date of Patent: Nov. 17, 1992

[54] VEHICLE-TO-VEHICLE DISTANCE DETECTING APPARATUS

[75] Inventor: Yoshiaki Asayama, Himeji, Japan

[73] Assignee: Mitsubishi Denki K.K., Tokyo, Japan

[21] Appl. No.: 663,532

[22] Filed: Mar. 4, 1991

[30] Foreign Application Priority Data

Mar. 20, 1990 [JP] Japan .................. 2-71384

[51] Int. Cl.⁵ .................. B60Q 1/00; G08G 1/16
[52] U.S. Cl. .................. 340/435; 340/436;
340/901; 340/903; 340/937; 340/942; 358/105;
358/125; 180/167; 180/169; 180/271
[58] Field of Search .............. 340/435, 903, 901, 436,
340/937, 942; 342/55, 47, 66, 126, 118, 450,
451; 358/107, 108, 125, 110, 113; 180/167-169,
271

[56] References Cited

U.S. PATENT DOCUMENTS

| | | | |
|---|---|---|---|
| 4,539,590 | 9/1985 | Gage | 358/107 |
| 4,709,264 | 11/1987 | Tamura et al. | 358/107 |
| 4,779,095 | 10/1988 | Guerreri | 340/901 |
| 4,908,704 | 3/1990 | Fujioka et al. | 358/108 |
| 5,026,153 | 6/1991 | Suzuki et al. | 340/903 |

FOREIGN PATENT DOCUMENTS

| | | |
|---|---|---|
| 2049634 | 4/1972 | Fed. Rep. of Germany . |
| 2223816 | 12/1975 | Fed. Rep. of Germany . |
| 3018470 | 12/1981 | Fed. Rep. of Germany . |
| 3146387 | 7/1982 | Fed. Rep. of Germany . |
| 3213709 | 10/1983 | Fed. Rep. of Germany . |
| 3407588 | 9/1985 | Fed. Rep. of Germany . |

OTHER PUBLICATIONS

BMW: Konzepte fur die Autozukunft, Computer am Ruder, Jul. 1990.

Primary Examiner—Donnie L. Crosland
Attorney, Agent, or Firm—Sughrue, Mion, Zinn, Macpeak & Seas

[57] ABSTRACT

A vehicle-to-vehicle distance detecting apparatus for use in tracing a preceding vehicle is disclosed in which the driver is able to set a vehicle tracing window on a displayed picture image of the preceding vehicle in an easy manner while driving the vehicle. Even if there are a plurality of preceding vehicles, the driver is able to easily identify a particular one of them which his or her vehicle is tracing for measuring the distance therebetween. The apparatus is also able to automatically monitor objects ahead of a vehicle and warn the driver of a possible danger of collision with an obstacle when no instruction is given by the driver for setting an image-tracing window for tracing a preceding vehicle. When an instruction switch is turned on by the driver after the image of the preceding vehicle comes in the image-tracing window formed at a prescribed position, a microcomputer controls, based on the image signals from the image sensors, the image-tracing window so as to trace the picture image of a preceding vehicle on the screen. The microcomputer detects the distance from the specific vehicle to the preceding vehicle or obstacle displayed on the screen in the image-tracing window and the distance from the specific vehicle to the preceding vehicle being image-traced on the screen in the image-tracing window.

6 Claims, 3 Drawing Sheets

PICTURE IMAGE
IN MEMORY 8

PICTURE IMAGE
IN MEMORY 9

VEHICLE-TO-VEHICLE DISTANCE DETECTING APPARATUS

BACKGROUND OF THE INVENTION

The present invention relates to a vehicle-to-vehicle distance detecting apparatus for measuring the distance from a vehicle to a preceding vehicle.

Some typical examples of such a vehicle-to-vehicle distance detecting apparatus are disclosed in Japanese Patent Publication Nos. 63-38085 and 63-46363. The apparatuses disclosed therein commonly have a pair of first and second parallel optical systems having two convex lenses 101, 102 disposed in a horizontally aligned relation at a prescribed distance L away from each other, as shown in FIG. 5. A pair of separate image sensors 103, 104 are horizontally disposed at focuses of the lenses 101, 102 apart their focal distance f from the locations of corresponding lenses 101, 102, respectively, for generating respective image signals to a common signal processor 120. The signal processor 120 successively shifts the image signals from the image sensors 103, 104 and electrically superposes them one over the other, so that the distance R from the lenses 101, 102 to an object 121 is calculated based on the principle of triangulation using the following formula:

$$R = (f \times L)/d$$

where d is a shift distance by which the image signals are moved to obtain the best match.

On the other hand, a typical method of tracking a preceding vehicle as taken by an image sensor or the like is disclosed in Japanese Patent Publication No. 60-33352. In this method, for the purpose of tracking a target on a display screen, an operator has to set on the display screen a tracking gate or window which encloses or surrounds the target to be tracked, while looking at the screen.

With the vehicle-to-vehicle distance detecting apparatus as described above which operates to successively detect the distance from a vehicle to a preceding vehicle using, in combination, an optical distance measuring device equipped with an image sensor and a vehicle-image device, it is practically impossible for the driver to safely form a window or tracking gate similar in configuration to the image of the preceding vehicle using a joy stick, a track ball, a mouse and the like, while driving the vehicle, as described in Japanese Patent Publication No. 60-33352.

SUMMARY OF THE INVENTION

Accordingly, the present invention is intended to obviate the above-described problems of the known vehicle-to-vehicle distance detecting apparatus.

An object of the invention is to provide a novel and improved vehicle-to-vehicle distance detecting apparatus for use in tracking a preceding vehicle in which the driver is able to set a vehicle tracking window on a displayed image of the preceding vehicle in an easy manner while driving the vehicle.

Another object of the invention is to provide a novel and improved vehicle-to-vehicle distance detecting apparatus in which, even if there are a plurality of preceding vehicles, the driver is able to easily identify a particular one of them, which his or her vehicle is tracking, for measuring the distance therebetween.

A further object of the invention is to provide a novel and improved vehicle-to-vehicle distance detecting apparatus which is able to automatically monitor objects ahead of a vehicle and warn the driver of a possible danger of collison with an obstacle when no instruction is given by the driver for setting an image-tracking window for tracking a preceding vehicle.

In order to achieve the above objects, according to the present invention, there is provided a vehicle-to-vehicle distance detecting apparatus for use in tracking a preceding vehicle, the apparatus comprising:

image sensor means mounted on a specific vehicle for taking a picture image of a preceding vehicle or obstacle;

display means for displaying the picture image taken by the image sensor means on a screen and having an image-tracking window displayed on the screen at a prescribed position;

instruction means being operated by the driver of the vehicle for generating an image-tracking instruction;

image-tracking means being operated by the instruction means for tracking the picture image of a preceding vehicle on the screen in the image-tracking window once the image of the preceding vehicle comes in the image-tracking window;

detecting means for detecting the distance from the specific vehicle to the preceding vehicle or obstacle displayed on the screen in the image-tracking window and the distance from the specific vehicle to the preceding vehicle being image-tracked on the screen in the image-tracking window; and warning means being operable to generate a warning to the driver when the distance from the specific vehicle to the preceding vehicle or obstacle becomes less than a prescribed level during the time the instruction means remains inoperative.

The image-tracking window is displayed on the screen of the display means at a predetermined location. When a preceding vehicle to be traced comes on the screen, the driver operates the vehicle in such a manner as to set the picture image of the preceding vehicle to be inside the image-tracking window. When the driver turns on the instruction switch after the entire image of the preceding vehicle is set inside the image-tracking window, the image of the preceding vehicle is automatically traced by the image-tracking window. On the other hand, when the distance from the specific vehicle to the preceding vehicle or obstacle which is in the image-tracking window becomes less than the predetermined level during the time the instruction switch is inoperative, the warning means is automatically actuated to generate a warning to the driver.

The above and other objects, features and advantages of the present invention will become more readily apparent from the following detailed description of a preferred embodiment thereof taken in conjunction with the accompanying drawings.

DESCRIPTION OF A PREFERRED EMBODIMENT

An embodiment of the present invention will now be described in detail with reference to the accompanying drawings.

Figure 1:
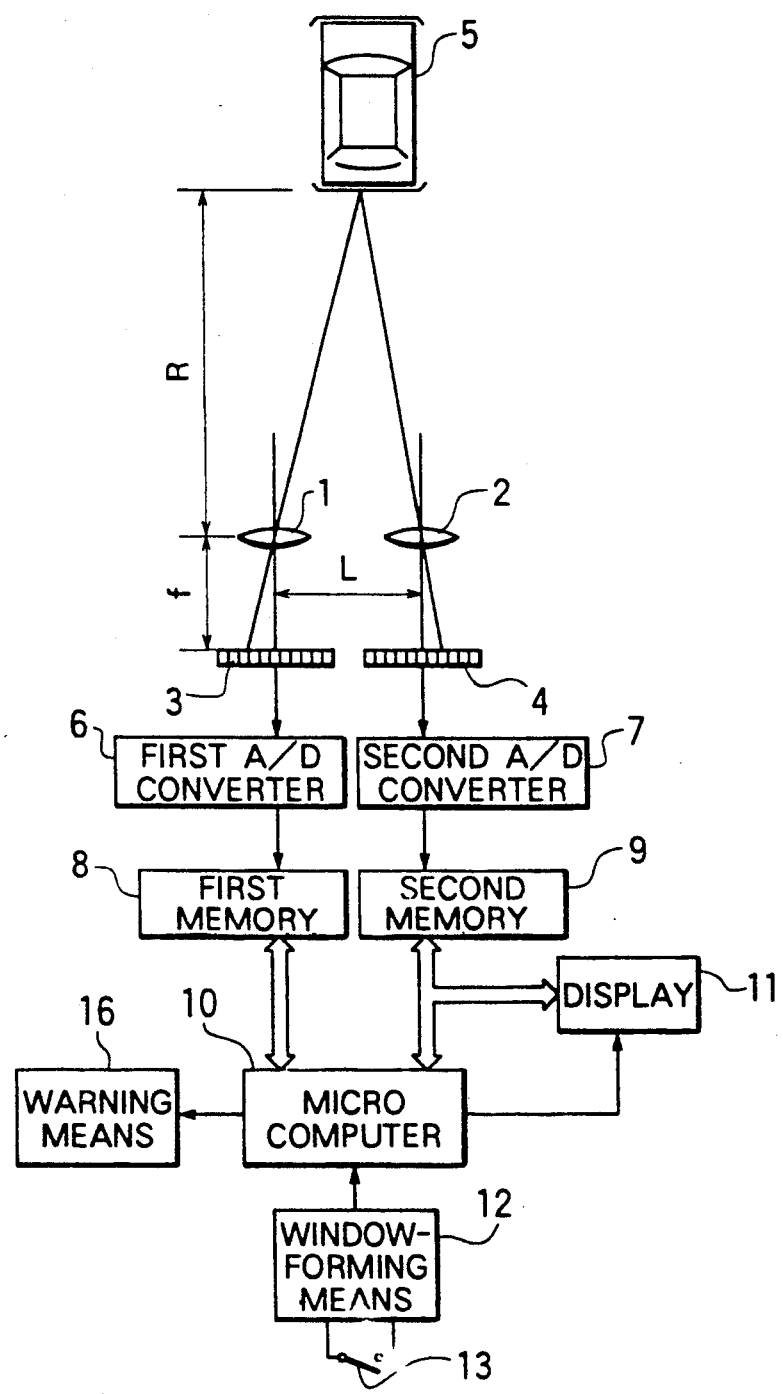
FIG. 1 is a block diagram of a vehicle-to-vehicle distance detecting apparatus for use in tracing a preceding vehicle in accordance with the present invention.

FIG. 1 illustrates the schematic construction of a vehicle-to-vehicle distance detecting apparatus for use in tracing a preceding vehicle. The apparatus illustrated includes a pair of first and second parallel optical systems having two convex lenses 1, 2 disposed in a horizontally aligned relation at a prescribed distance L away from each other, and a pair of separate first and second (or left-hand and right-hand) image sensors 3, 4 which are horizontally disposed at focuses of the lenses 1, 2 at a distance f from the locations of corresponding lenses 1, 2, respectively, for generating respective image signals each in the form of an analog signal representative of a two-dimensional image to a pair of corresponding analog-to-digital (A/D) converters 6, 7. The outputs of the A/D converters 6, 7 are input to a pair of corresponding first and second memories 8, 9 and stored therein. A microcomputer 10 performs data transfer with the memories 8, 9 as well as various calculations and determinations based on the data stored in the memories. A display means 11 having a screen is connected to the second memory 9 and the microcomputer 10 for displaying an image formed by the second image sensor 4 on the screen. The operation of the display means 11 is controlled by the microcomputer 10. A window forming means 12 is connected to the microcomputer 10 and controlled thereby to form an image-tracing window on the screen of the display means 11. An instruction switch 13 is connected to the window forming means 12 and is operated by the driver to turn the window forming means on and off. A warning means 16 is connected to the microcomputer 10 for generating a warning to the driver.

Figure 2:
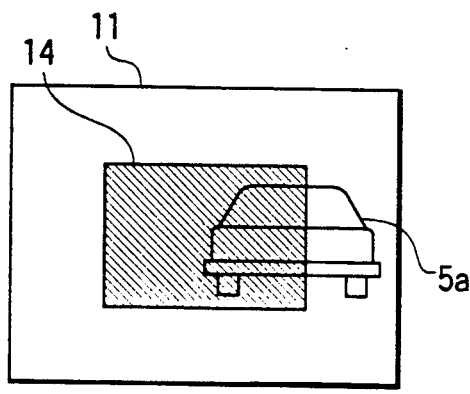
FIG. 2 is an explanatory view showing that an image of a preceding vehicle comes on the screen of a display in the apparatus of FIG. 1.
Figure 3:
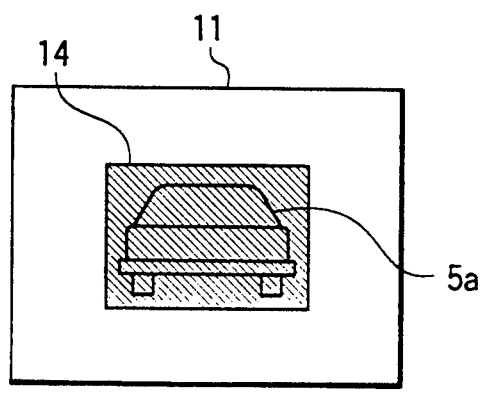
FIG. 3 is an explanatory view showing that an image of a preceding vehicle is set inside an image-tracing window in the apparatus of FIG. 1.

The operation of the above-described apparatus will now be described with particular reference to FIGS. 2, 3, 4(a) and 4(b). First, as shown in FIG. 2, let us assume that an image of a preceding vehicle 5 to be tracked is caught and formed by the second or right-hand image sensor 4 and displayed on the screen of the display means 11. In this case, the driver operates to properly steer his vehicle and change the relative position thereof with respect to the preceding vehicle 5 so that the entire image 5a of the preceding vehicle 5 comes in the image-tracking window 14 which is in advance formed on the screen of the display means 11. Subsequently, when the image-tracking instruction switch 13 is turned on by the driver after the entire image 5a of the preceding vehicle 5 has completely entered the image-tracking window 14 as shown in FIG. 3, the microcomputer 10 operates to control the display means 11 so that the image-tracking window 14 automatically moves and follows the image of the preceding vehicle 5 irrespective of any changes in the movement of the vehicle 5 taking place in the screen.

Such an image-tracking operation is already well known in the art and described, for example, in Japanese Patent Publication 60-33352 or 1-35305.

Figure 4:
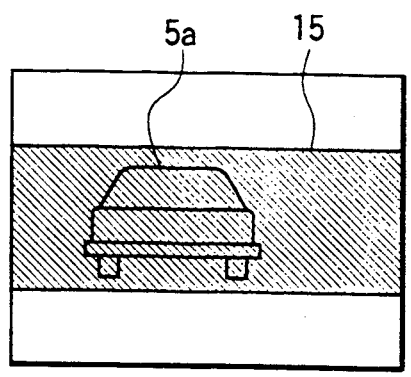
FIGS. 4(a) and 4(b) are explanatory views showing corresponding image areas in a first and a second memory which are to be compared with each other.
Figure 4:
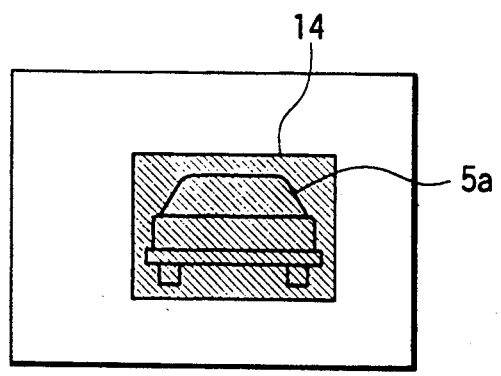
Figure 5:
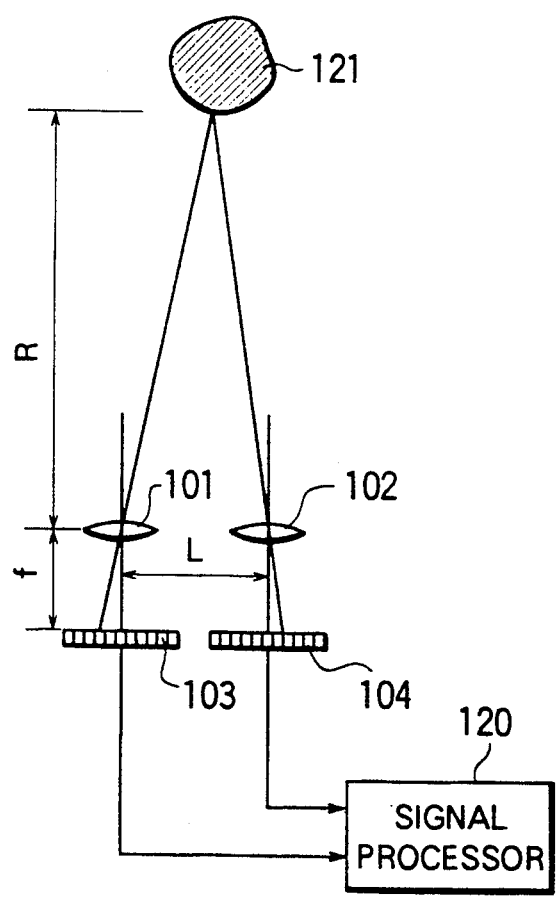
FIG. 5 is a schematic block diagram of the general construction of a known vehicle-to-vehicle distance detecting apparatus.

Next, the operation of the apparatus for detecting the distance from the specific vehicle to a preceding vehicle will be described. First, the microcomputer 10 reads out from the second or right-hand memory 9 picture element signals within the image-tracing window 14 which is tracing the image 5a of the preceding vehicle 5, and designates them as reference image signals. Then, the microcomputer 10 selects an area in the first or left-hand memory 8, which stores the image signals of the left-hand image sensor 3, corresponding to the image-tracking window 14, and successively calculates the absolute value of a difference between the right-hand and left-hand image signals at every picture element and sums them up while shifting the image signals from the first or left-hand memory 8 one picture element by one picture element against the reference image signals. In other words, the position of a picture most matching the picture in the image-tracking window 14 is determined by successively shifting the image signals from the first or left-hand memory 8 one picture element at a time. At this time, the area relating to the above calculations of the microcomputer 10 corresponds to an area 15 in the first or left-hand memory 8 including the image 5a of the preceding vehicle 5, as shown in FIG. 4(a), with respect to the reference image signals in the image-tracking window 14 on the screen of the display means 11, as shown in FIG. 4(b).

Thus, the first and second (or right-hand and left-hand) image signals at their corresponding picture elements are compared with each other in the above manner, and the amount of shift of the second picture elements, when a total sum of the absolute values of the differences in the first and second picture element signals, is minimized is calculated as n times a unit length (pitch P) of a picture element, and the distance R between the preceding vehicle 5 and the lenses 1, 2 is calculated using the following formula:

$$R = (f \times L)/(n \times P)$$

where f is the focal distance of the lenses 1, 2 and L is the distance between the central points of the first and second lenses 1, 2.

In this manner, it is possible for the image-tracking window 14 to track the predetermined preceding vehicle 5 even if the vehicle 5 moves sidewards, so as to successively determine the distance from the specific vehicle to the preceding vehicle 5.

On the other hand, in cases where the image-tracking instruction switch 13 is inoperative or turned off, when a preceding vehicle 5 or obstacle ahead of the specific vehicle comes into the image-tracking window 14, the distance to the preceding vehicle or obstacle is automatically detected in the same manner as described above.

When the distance to the preceding vehicle 5 or obstacle becomes less than a prescribed level, the microcomputer 10 actuates the warning means 16 so that a warning is generated to warn the driver of the impending danger of a collision, thus alerting the driver of an abnormality of a short distance to the preceding vehicle or obstacle so that necessary actions may be taken to avoid a collision.

As described in the foregoing, according to the present invention, when the image of a preceding vehicle 5 comes into the image-tracking window 14 which is displayed on the screen of the display means 11 at a predetermined location thereof and the image-tracking instruction switch 13 is turned on by the driver, the microcomputer 10 operates to automatically control the image-tracking window 14 so as to follow the preceding vehicle 5a. As a result, the driver is able to start image-tracking with extreme ease just by turning on the image-tracking instruction switch 13 while driving the vehicle.

Further, the frame of the image-tracking window 14 and the image of a preceding vehicle 5 therein are always displayed on the screen of the display means 11 so that the driver can exactly recognize the preceding vehicle which his or her vehicle is tracking for detecting the distance thereto even if a plurality of vehicles are travelling ahead of his or her vehicle.

Moreover, the microcomputer 10 operates to control the display means 11 so that when the image-tracking instruction switch 13 is inoperative or turned off, the image-tracking window 14 monitors objects such as preceding vehicles, obstacles and the like ahead of his or her vehicle. As a result, safety in driving can be improved even in cases where the driver maneuvers the vehicle without intentionally tracking a preceding vehicle.

What is claimed is:

1. A vehicle-to-vehicle distance detecting apparatus for use in tracking a preceding vehicle, the apparatus comprising:

image sensor means mounted on a specific vehicle for taking a picture image of a preceding vehicle or obstacle;

display means for displaying the picture image taken by the image sensor means on a screen and having an image-tracking window displayed on the screen at an initially prescribed position;

instruction means being operated by the driver of the vehicle for generating an image-tracking instruction;

image-tracking means being operated by the instruction means for tracking the picture image of the preceding vehicle or obstacle on the screen in the image-tracking window once the image of the preceding vehicle comes in the image-tracing window;

detecting means for detecting the distance from the specific vehicle to the preceding vehicle or obstacle displayed on the screen in the image-tracking window and the distance from the specific vehicle to the preceding vehicle or obstacle being image-tracked on the screen in the image-tracking window; and warning means being operable to generate a warning to the driver when the distance from the specific vehicle to the preceding vehicle or obstacle becomes less than a prescribed level during the time the instruction means remains inoperative.

2. A vehicle-to-vehicle distance detecting apparatus according to claim 1, further comprising a pair of first and second lenses disposed at a predetermined distance from each other, wherein said image sensor means comprises a first and a second image sensor disposed at a predetermined distance from each other at locations of focuses of the corresponding lenses.

3. A vehicle-to-vehicle distance detecting apparatus according to claim 2, further comprising a pair of first and second A/D converters for performing A/D conversion of the image signals of the first and second image sensors, respectively, and a pair of first and second memories for successively storing the outputs of the first and second A/D converters.

4. A vehicle-to-vehicle distance detecting apparatus according to claim 3, wherein the image-tracing means and the detecting means comprise a microcomputer which performs data transfer with the first and second memories and successively calculates the distance from the specific vehicle to the preceding vehicle or obstacle based on the digitized image signals of the first and second image sensors successively stored in the first and second memories.

5. A vehicle-to-vehicle distance detecting apparatus according to claim 4, wherein the display means is connected to one of the first and second memories and to the microcomputer for displaying the picture image of the preceding vehicle or obstacle on the screen based on the digitized image signals from one of the first and second image sensors.

6. A vehicle-to-vehicle distance detecting apparatus according to claim 5, wherein the microcomputer shifts the image signal of one of the first and second image sensors stored in the corresponding memory so as to provide the best match with the image signal of the other image sensor stored in the other memory, and calculates the distance from the specific vehicle to the preceding vehicle or obstacle based on the amount of shift which gives the best match between the image signals.

* * * * *